(12) United States Patent
Takano et al.

(10) Patent No.: US 12,452,798 B2
(45) Date of Patent: Oct. 21, 2025

(54) RF ENERGY RADIATION DEVICE

(71) Applicant: Panasonic Intellectual Property Management Co., Ltd., Osaka (JP)

(72) Inventors: Shinji Takano, Kyoto (JP); Takashi Uno, Shiga (JP); Mikio Fukui, Shiga (JP); Chikako Hosokawa, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 250 days.

(21) Appl. No.: 18/261,272

(22) PCT Filed: Feb. 15, 2022

(86) PCT No.: PCT/JP2022/005979
§ 371 (c)(1),
(2) Date: Jul. 13, 2023

(87) PCT Pub. No.: WO2022/176857
PCT Pub. Date: Aug. 25, 2022

(65) Prior Publication Data
US 2024/0073829 A1  Feb. 29, 2024

(30) Foreign Application Priority Data
Feb. 19, 2021 (JP) ................. 2021-024908

(51) Int. Cl.
*H04W 52/30* (2009.01)
*H04W 52/08* (2009.01)
*H04W 52/10* (2009.01)

(52) U.S. Cl.
CPC ........... *H04W 52/30* (2013.01); *H04W 52/08* (2013.01); *H04W 52/10* (2013.01)

(58) Field of Classification Search
CPC ...... H04W 52/30; H04W 52/08; H04W 52/10
See application file for complete search history.

(56) References Cited

U.S. PATENT DOCUMENTS 6,882,128 B1* 4/2005 Rahmel .................. H02J 50/70
                                                  455/343.1
7,088,999 B2* 8/2006 Shih ....................... H04W 52/10
                                                  455/423
(Continued)

FOREIGN PATENT DOCUMENTS

JP  2018-142452   9/2018
JP  2019-509587   4/2019
(Continued)

OTHER PUBLICATIONS

International Search Report of PCT application No. PCT/JP2022/005979 dated Apr. 19, 2022.

*Primary Examiner* — Hai V Nguyen
(74) *Attorney, Agent, or Firm* — Wenderoth, Lind & Ponack, L.L.P.

(57) ABSTRACT

An RF energy radiation device of this disclosure comprises: an oscillator; a power amplifier; a radiation element; a detector; and a controller. The oscillator generates an RF signal. The power amplifier amplifies the RF signal to output RF power. The radiation element radiates the RF power. The detector detects progressive wave power. The controller performs an RF power output control using a closed-loop control for setting an output set value of the RF power by a closed-loop and an open-loop control for setting the output set value of the RF power by an open-loop. In a burst operation alternately switching between a period of outputting the RF power and a period of stopping the RF power, the controller changes the RF power output control from the closed-loop control to the open-loop control when a specified condition for change is satisfied during the period of stopping the RF power.

7 Claims, 10 Drawing Sheets

(56) References Cited

U.S. PATENT DOCUMENTS

| | | | | |
|---|---|---|---|---|
| 7,268,517 | B2* | 9/2007 | Rahmel | H02J 50/001 |
| | | | | 455/343.1 |
| 7,720,502 | B2* | 5/2010 | Suga | H04W 52/246 |
| | | | | 455/69 |
| 9,518,555 | B2* | 12/2016 | Bokatius | H01T 21/02 |
| 9,601,831 | B2* | 3/2017 | Watanabe | H01Q 1/48 |
| 9,614,664 | B2* | 4/2017 | Morita | H04L 7/0016 |
| 10,368,404 | B2* | 7/2019 | Johansson | H05B 6/686 |
| 10,772,165 | B2* | 9/2020 | Guatta | H05B 6/745 |
| 10,820,382 | B2* | 10/2020 | Guatta | H05B 6/686 |
| 10,993,293 | B2* | 4/2021 | Mattfolk | H05B 6/6417 |
| 11,039,510 | B2* | 6/2021 | Guatta | H05B 6/6458 |
| 11,197,355 | B2* | 12/2021 | Rigo | H05B 6/705 |
| 11,202,348 | B2* | 12/2021 | Rigo | H05B 6/705 |
| 11,804,807 | B2* | 10/2023 | Brindani | H05B 6/64 |
| 11,955,992 | B2* | 4/2024 | Chen | H04L 1/0071 |
| 2004/0121795 | A1* | 6/2004 | Shih | H04B 1/3838 |
| | | | | 455/522 |
| 2008/0009306 | A1* | 1/2008 | Suga | H04W 52/267 |
| | | | | 455/522 |
| 2009/0039962 | A1* | 2/2009 | Uno | H03F 1/56 |
| | | | | 330/286 |
| 2016/0160833 | A1* | 6/2016 | Bokatius | H01T 13/16 |
| | | | | 29/601 |
| 2016/0323939 | A1* | 11/2016 | Mattfolk | H05B 6/681 |
| 2018/0133518 | A1* | 5/2018 | Harper | A61N 5/1049 |
| 2019/0045589 | A1* | 2/2019 | Guatta | H05B 6/686 |
| 2019/0098709 | A1* | 3/2019 | Guatta | H05B 6/687 |
| 2019/0239297 | A1* | 8/2019 | Guatta | H05B 6/686 |
| 2019/0306934 | A1* | 10/2019 | Rigo | H05B 6/72 |
| 2019/0306936 | A1* | 10/2019 | Rigo | H05B 6/681 |
| 2019/0312555 | A1* | 10/2019 | Brindani | H03F 1/52 |
| 2019/0313489 | A1* | 10/2019 | Guatta | H05B 6/72 |
| 2020/0260538 | A9* | 8/2020 | Guatta | H05B 6/705 |
| 2021/0274609 | A1* | 9/2021 | Takano | H03F 3/19 |
| 2024/0172199 | A1* | 5/2024 | Jung | H04L 5/0092 |
| 2024/0341015 | A1* | 10/2024 | Takano | H05B 6/645 |
| 2025/0106957 | A1* | 3/2025 | Sugaya | H05B 6/72 |

FOREIGN PATENT DOCUMENTS

| | | | | |
|---|---|---|---|---|
| WO | WO-2017131698 A1 | * | 8/2017 | ............ H05B 6/687 |
| WO | WO-2018075026 A1 | * | 4/2018 | ............ H05B 6/72 |
| WO | WO-2023026947 A1 | * | 3/2023 | ............ H05B 6/705 |

* cited by examiner

Case of changing the output control of the RF power from the closed-loop control to the open-loop control according to the temperature change Case of changing the output control of the RF power from the closed-loop control to the open-loop control according to the output stopping duration time Temporal changes in the output set value of the RF power during the transient period after restrat of outputting the RF power

RF ENERGY RADIATION DEVICE

TECHNICAL FIELD

The present disclosure relates to a radio frequency energy (RF energy) radiation device.

BACKGROUND ART

PTL 1, for example, discloses a conventional RF energy radiation device that radiates radio frequency energy (RF energy) by a burst operation. The burst operation is such an operation that radiates RF energy applied to an object to be heated by alternately repeating a period of outputting radio frequency power (RF power) and a period of stopping the RF power.

PTL 2 discloses an RF energy radiation device of the above-described type which uses a closed-loop control and an open-loop control to stabilize the output level of the RF power.

In the closed-loop control, progressive wave power is detected, and an output level of the RF power is determined according to an error between the detected progressive wave power and a target output level. In the open-loop control, the output level of the RF power is determined using a table which has been previously prepared based, for example, on the frequency of the output RF power and temperature information of an element used.

FIG. 10 is a schematic diagram showing a configuration of the RF energy radiation device disclosed in PTL 2. As shown in FIG. 10, this conventional RF energy radiation device has controller 201, oscillator 202, power amplifier 203, power source 204, and detectors 220.

Oscillator 202 generates and outputs an RF signal. Power amplifier 203 amplifies the RF signal from oscillator 202 to output the amplified RF signal as RF power. The RF power is fed to cavity 207 to heat object 208, which is placed in cavity 207 to be heated, by the microwave energy. Object 208 may, for example, be a foodstuff.

Each of detectors 220 detects the RF signal. Controller 201 includes processor 205 and memory 206. Controller 201 receives information from detectors 220, and controls oscillator 202 and power amplifier 203. Power source 204 supplies power to controller 201, oscillator 202, and power amplifier 203.

CITATION LIST

Patent Literature

PTL 1: Unexamined Japanese Patent Publication No. 2018-142452
PTL 2: Japanese Translation of PCT Publication No. 2019-509587

SUMMARY OF THE INVENTION

FIG. 11 is a diagram showing temporal changes in the RF power outputted from power amplifier 203 and in the temperature of power amplifier 203 when the RF energy radiation device shown in FIG. 10 is performing the burst operation. When RF amplifier 203 restarts outputting the RF power from the state in which the temperature of power amplifier 203 has dropped in the burst operation, a phenomenon similar to an overshoot of the output RF power occurs.

This phenomenon is caused by the rapid change in the junction temperature of the transistor constituting power amplifier 203. Normally, power amplifier 203 has such a temperature characteristic that the output RF power varies depending on the temperature. Therefore, the RF power reduces with the rise of the temperature of power amplifier 203. As a result, the overshoot of the RF power as shown in FIG. 11 appears.

In the process of performing the microwave heating by executing the output control of the RF power at short cycles, the above-described phenomenon affects the quality of heating the object to be heated. Accordingly, accuracy of the output control of the RF power is important for using the burst operation. It is a conventional method to change the output control of the RF power in the burst operation from the closed-loop control to the open-loop control. However, this method is imperfect as a measure to suppress the phenomenon similar to the overshoot of the RF power.

An object of the present disclosure is to improve the accuracy of the output control of the RF power in the RF energy radiation device.

A radio frequency energy radiation device of the present disclosure comprises an oscillator, a power amplifier, a radiation element, a detector, and a controller. The oscillator generates a radio frequency signal (an RF signal). The power amplifier amplifies the radio frequency signal to output radio frequency power (RF power). The radiation element radiates the radio frequency power. The detector detects the radio frequency power travelling toward the radiation element as progressive wave power.

The controller performs an output control of the radio frequency power using a closed-loop control that sets an output set value of the radio frequency power by a closed-loop and an open-loop control that sets the output set value of the radio frequency power by an open-loop.

In a burst operation alternately switching between a period of outputting the radio frequency power and a period of stopping the radio frequency power, the controller changes the output control of the radio frequency power from the closed-loop control to the open-loop control in a case where a specified condition for change is satisfied during the period of stopping the radio frequency power.

According to the radio frequency energy radiation device of the present disclosure, it is possible to perform the output control of the radio frequency power without being affected by the temperature rise of the heat generating element in the burst operation, so that the overshoot of the radio frequency power can be suppressed. As a result, it is possible to improve the accuracy of the output control of the radio frequency power.

DESCRIPTION OF EMBODIMENTS

Figure 1:
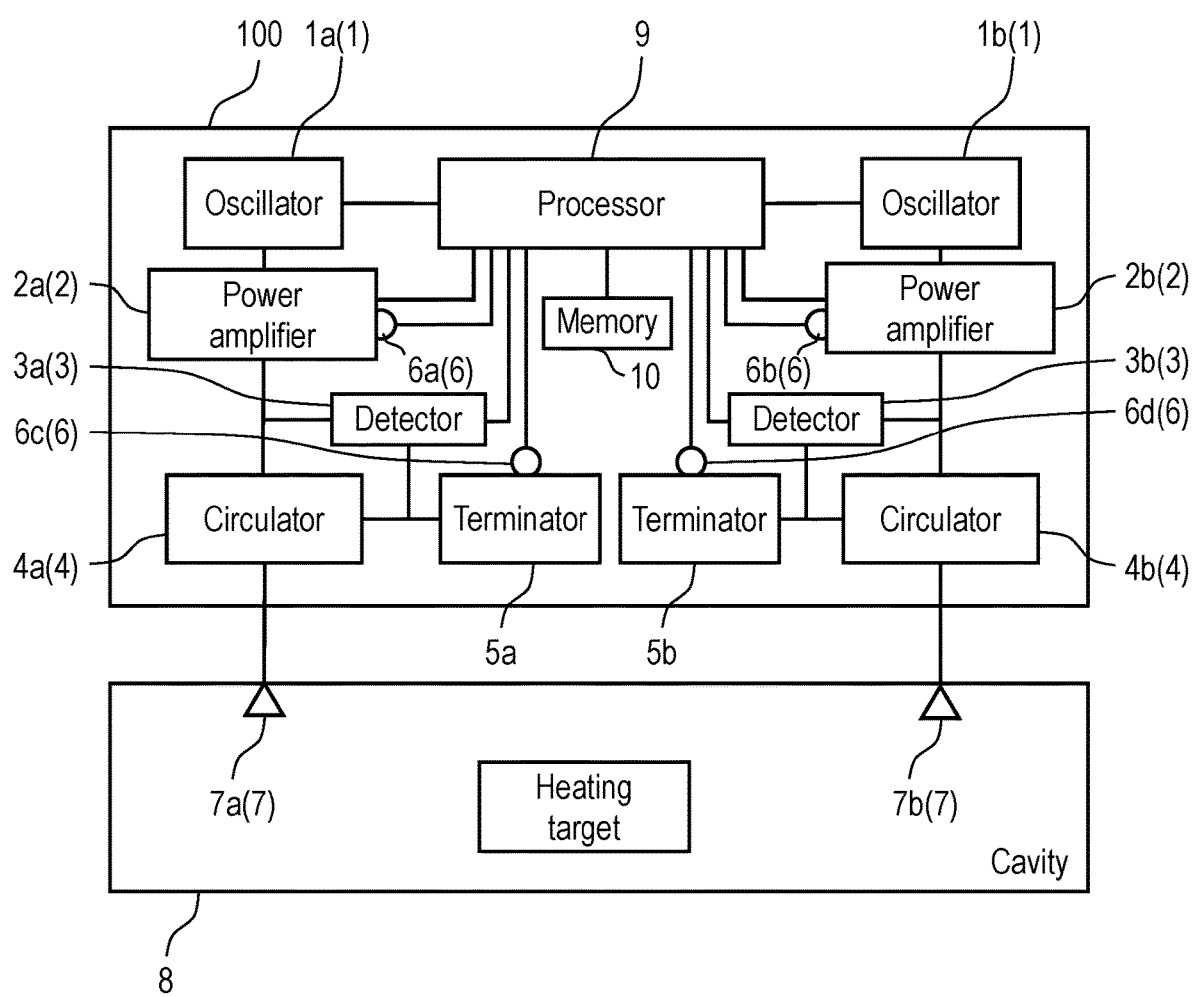
FIG. 1 is a schematic diagram showing a configuration of an RF energy radiation device according to an exemplary embodiment of the present disclosure.

A radio frequency energy radiation device (an RF energy radiation device) in a first aspect of the present disclosure comprises an oscillator, a power amplifier, a radiation element, a detector, and a controller. The oscillator generates a radio frequency signal (an RF signal). The power amplifier amplifies the RF signal to output radio frequency power (RF power). The radiation element radiates the RF power. The detector detects the RF power travelling toward the radiation element as progressive wave power.

The controller performs an output control of the RF power using a closed-loop control that sets an output set value of the RF power by a closed-loop and an open-loop control that sets the output set value of the RF power by an open-loop.

In a burst operation alternately switching between a period of outputting the RF power and a period of stopping the RF power, the controller changes the output control of the RF power from the closed-loop control to the open-loop control in a case where a specified condition for change is satisfied during the period of stopping the RF power.

According to the RF energy radiation device in the first aspect, it is possible to perform the output control of the RF power without being affected by the temperature rise of the heat generating element in the burst operation, so that the overshoot of the RF power can be suppressed.

In an RF energy radiation device in the second aspect of the present disclosure, in addition to the first aspect, the specified condition for change is a condition that the period of stopping the RF signal exceeds a specified length of time.

An RF energy radiation device in the third aspect of the present disclosure further comprises, in addition to the first aspect, a temperature sensor that is configured to detect a temperature of the power amplifier. The specified condition for change is a condition that a change in the temperature of the power amplifier exceeds a specified value during the period of stopping the RF power.

In an RF energy radiation device in the fourth aspect of the present disclosure, in addition to the first aspect, the controller applies at least one transient coefficient to an output target value of the RF power obtained by the closed-loop control or the open-loop control to increase the output set value in a stepwise manner until the output set value reaches the output target value.

An RF energy radiation device in the fifth aspect of the present disclosure further comprises, in addition to the first aspect, a memory that stores a table which has been prepared in advance. The controller uses the table to set the output set value of the RF power in the open-loop control.

In an RF energy radiation device in the sixth aspect of the present disclosure, in addition to the first aspect, the controller does not change the output control of the RF power from the closed-loop control to the open-loop control even in the case where the specified condition for change is satisfied to cause an overshoot of the RF power in the burst operation.

An RF energy radiation device in the seventh aspect of the present disclosure further comprises, in addition to the first aspect, a temperature sensor that detects a temperature of the power amplifier, and a terminator that terminates reflected wave power that is a part of the progressive wave power and returned from the radiation element. The power amplifier includes a large signal amplifier. The controller calculates an approximate value of a case temperature of the large power amplifier from a temperature detected by the temperature sensor based on heat generated by the terminator.

Hereinafter, an exemplary embodiment of the present disclosure will be described with reference to the drawings. FIG. 1 is a schematic diagram showing a configuration of RF energy radiation device 100 according to the present exemplary embodiment.

As shown in FIG. 1, RF energy radiation device 100 has oscillators 1, power amplifiers 2, detectors 3, circulators 4, terminators 5, temperature sensors 6, radiation elements 7, processor 9, and memory 10.

Oscillators 1 include two oscillators—oscillator 1*a* and oscillator 1*b*. Power amplifiers 2 include two power amplifiers—power amplifier 2*a* and power amplifier 2*b*. Detectors 3 include two detectors—detector 3*a* and detector 3*b*. Circulators 4 include two circulators—circulator 4*a* and circulator 4*b*.

Terminators 5 include two terminators—terminator 5*a* and terminator 5*b*. Temperature sensors 6 include four temperature sensors—temperature sensor 6*a*, temperature sensor 6*b*, temperature sensor 6*c*, and temperature sensor 6*d*. Radiation elements 7 include two radiation elements—radiation element 7*a* and radiation element 7*b*.

Each of oscillators 1*a* and 1*b* generates and outputs an RF signal. Each of power amplifiers 2*a* and 2*b* amplifies the RF signal outputted from a corresponding one of oscillators 1*a* and 1*b* to output the amplified signal as progressive wave power. Each of detectors 3*a* and 3*b* detects the progressive wave power and reflected wave power.

The progressive wave power means RF power which travels from each of power amplifiers 2*a* and 2*b* through a corresponding one of circulators 4*a* and 4*b* to a corresponding one of radiation elements 7*a* and 7*b*. The reflected wave power means RF power which is a part of the progressive wave power and returned from each of radiation elements 7*a* and 7*b* to a corresponding one of circulators 4*a* and 4*b*.

Each of circulators 4*a* and 4*b* fixes the path of the progressive wave power and the path of the reflected wave power to protect the corresponding one of power amplifiers 2*a* and 2*b* from the reflected wave power that varies depending on the load variation of the object to be heated. Each of terminators 5*a* and 5*b* has a specific impedance that becomes a load with respect to the reflected wave power from the corresponding one of circulators 4*a* and 4*b*.

Radiation element 7*a* radiates in cavity 8 the RF energy transmitted from power amplifier 2*a* through circulator 4*a*.

Radiation element 7b radiates in cavity 8 the RF energy transmitted from power amplifier 2b through circulator 4b.

Temperature sensors 6a and 6b are respectively disposed near power amplifiers 2a and 2b to detect respective temperatures of power amplifiers 2a and 2b. Temperature sensors 6c and 6d are respectively disposed near terminators 5a and 5b to detect respective temperatures of terminators 5a and 5b.

Memory 10 is a semiconductor memory, for example, and stores software and data for controlling RF energy radiation device 100. The data stored in memory 10 include a look up table which has been previously prepared for setting RF power suitable for the temperatures detected by temperature sensors 6a to 6d.

Processor 9 is a general-purpose microprocessor which functions as a controller for controlling RF energy radiation device 100. Processor 9 controls oscillators 1a and 1b and power amplifiers 2a and 2b by software-control according to a temperature detected by each of temperature sensors 6a to 6d.

Processor 9 in the present exemplary embodiment can refer to the temperature detected by each of temperature sensors 6a to 6d fifty (50) times per minute, for example. Processor 9 can output instructions to oscillators 1a and 1b and power amplifiers 2a and 2b according to the detected temperatures fifty (50) times per minute, for example. In other words, the cycle period of the software control in processor 9 (hereinafter referred to as the control period) is 20 ms.

Figure 2:
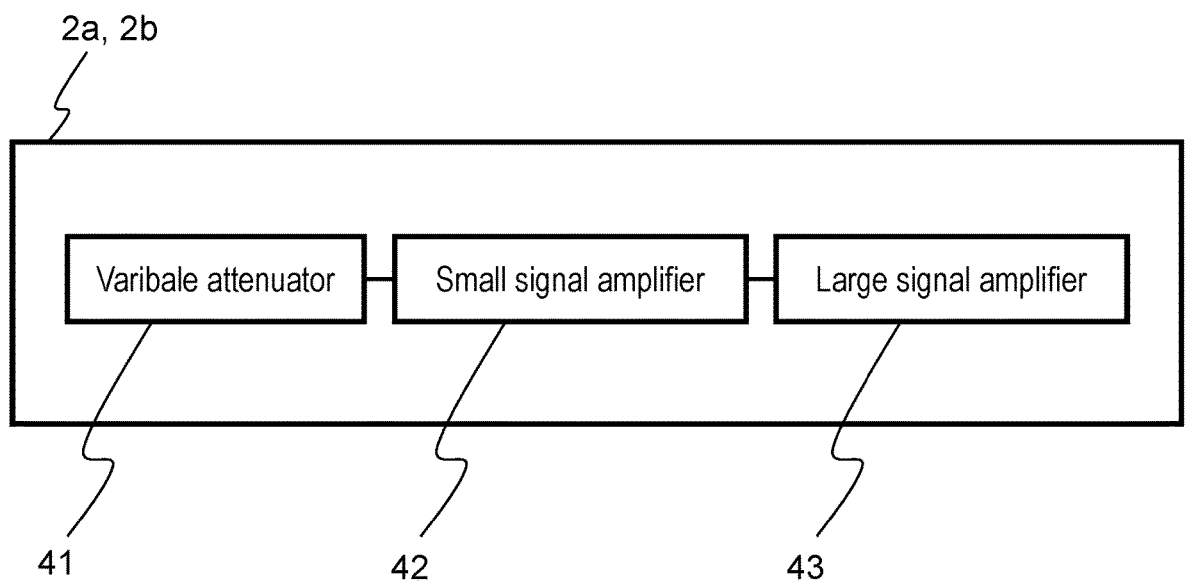
FIG. 2 is a schematic diagram showing a configuration of a power amplifier according to the exemplary embodiment of the present disclosure.

FIG. 2 is a schematic diagram showing a configuration of each of power amplifiers 2a and 2b. Power amplifiers 2a and 2b are the same in configuration as each other. Accordingly, only power amplifier 2a will be described. As shown in FIG. 2, power amplifier 2a has variable attenuator 41, small signal amplifier 42, and large signal amplifier 43.

Variable attenuator 41 receives the RF signal from oscillator 1a and adjusts the amount of attenuation of the RF signal. Small signal amplifier 42 amplifiers the signal outputted from variable attenuator 41 to a certain extent. Large signal amplifier 43 amplifiers the signal outputted from small signal amplifier 42 to an output level of the desired RF power.

Processor 9 can cause each of oscillators 1a and 1b to generate an RF signal having an arbitrary frequency in a specific frequency band. Processor 9 causes each of amplifiers 2a and 2b to amplify the RF signal from a corresponding one of oscillators 1a and 1b so that the output level of the RF power becomes an output target value.

To perform the output control of the RF power by the open-loop control, processor 9 calculates the output target value of the RF power in consideration of the temperature condition at that time based on the look up table, which has previously been prepared.

Each of power amplifiers 2a and 2b is an element that generates heat. The amount of heat generated by each of power amplifiers 2a and 2b varies depending on the value of the RF power (the progressive wave power) and the change in the efficiency due to the load variation. Processor 9 performs an output control of the RF power using the closed-loop control or the open-loop control. This output control is performed based on the information of the temperature detected by each of temperature sensors 6a and 6b and the progressive wave power and the reflected wave power which are detected by each of detectors 3a and 3b.

Temperature sensors 6a and 6b are disposed to detect the respective case temperatures of large signal amplifiers 43 which are respectively included in power amplifiers 2a and 2b. The reason for this is as follows. Here, the case temperature means the surface temperature of the semiconductor device.

A thermal resistance is generated between temperature sensor 6 and large signal amplifier 43. Factors that are relevant to the value of the thermal resistance include the value of the outputted RF power, the volume of the cooling air for cooling the corresponding one of power amplifiers 2a and 2b, and the state whether or not the RF power is being outputted or stopped. The thermal resistance influences on whether or not the temperature detected by temperature sensor 6 approximates the case temperature of large signal amplifier 43.

Accordingly, it is desirable that temperature sensors 6a and 6b are respectively disposed near power amplifiers 2a and 2b to minimize the error of the detected temperature due to the thermal resistance.

When each of radiation elements 7a and 7b radiates the RF power in cavity 8 and the RF power is fed to the object to be heated, the state of the object changes. The reflected wave power varies depending on the heated state of the object.

Terminators 5a and 5b are respectively connected to detectors 3a and 3b. Each of terminators 5a and 5b converts the reflected wave power to heat. In other words, RF energy radiation device 1009 has terminators 5a and 5b as heat generating elements in addition to large signal amplifiers 43.

The reflected wave power influences on the calculated value of the case temperature of large signal amplifier 43 calculated by processor 9. Processor 9 calculates the influence of the amount of heat generated by each of terminators 5a and 5b based on the level of the reflected wave power. This calculation allows processor 9 to accurately approximate the case temperature from the temperature detected by each of temperature sensors 6a and 6b.

Figure 3:
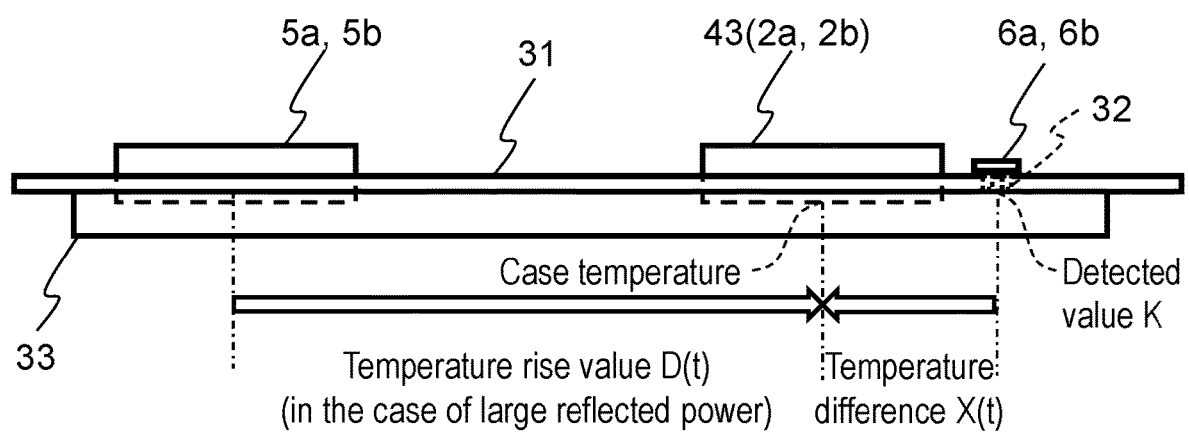
FIG. 3 is a schematic diagram showing an arrangement of a temperature sensor, a large signal amplifier, and a terminator according to the exemplary embodiment of the present disclosure.

FIG. 3 is a schematic diagram showing an arrangement of temperature sensors 6a and 6b, large signal amplifiers 43, and terminators 5a and 5b on substrate 31. It is assumed that temperature sensor 6a or 6b, large signal amplifier 43 of power amplifier 2a or 2b, and terminator 5a or 5b are arranged in the positional relation as shown in FIG. 3. Substrate 31 has hole 32 penetrating through base plate 33. Each of temperature sensors 6a and 6b is disposed at the position of hole 32.

Here, it is assumed that X(t) be a difference between an actual case temperature of large signal amplifier 43 and detected temperature K detected by a corresponding one of temperature sensors 6a and 6b during the transient period. Also, it is assumed that D(t) be a value of temperature rise of large signal amplifier 43 due to influence of the heat generated by a corresponding one of terminators 5a and 5b during the transient period, in which the reflected wave power is large. The transient period is the period from the time at which the output of the RF power in the burst operation is restarted until the time at which the flow of heat from the position of the corresponding one of temperature sensors 6a and 6b to the position of large signal amplifier 43 becomes in the steady state.

Figure 4:
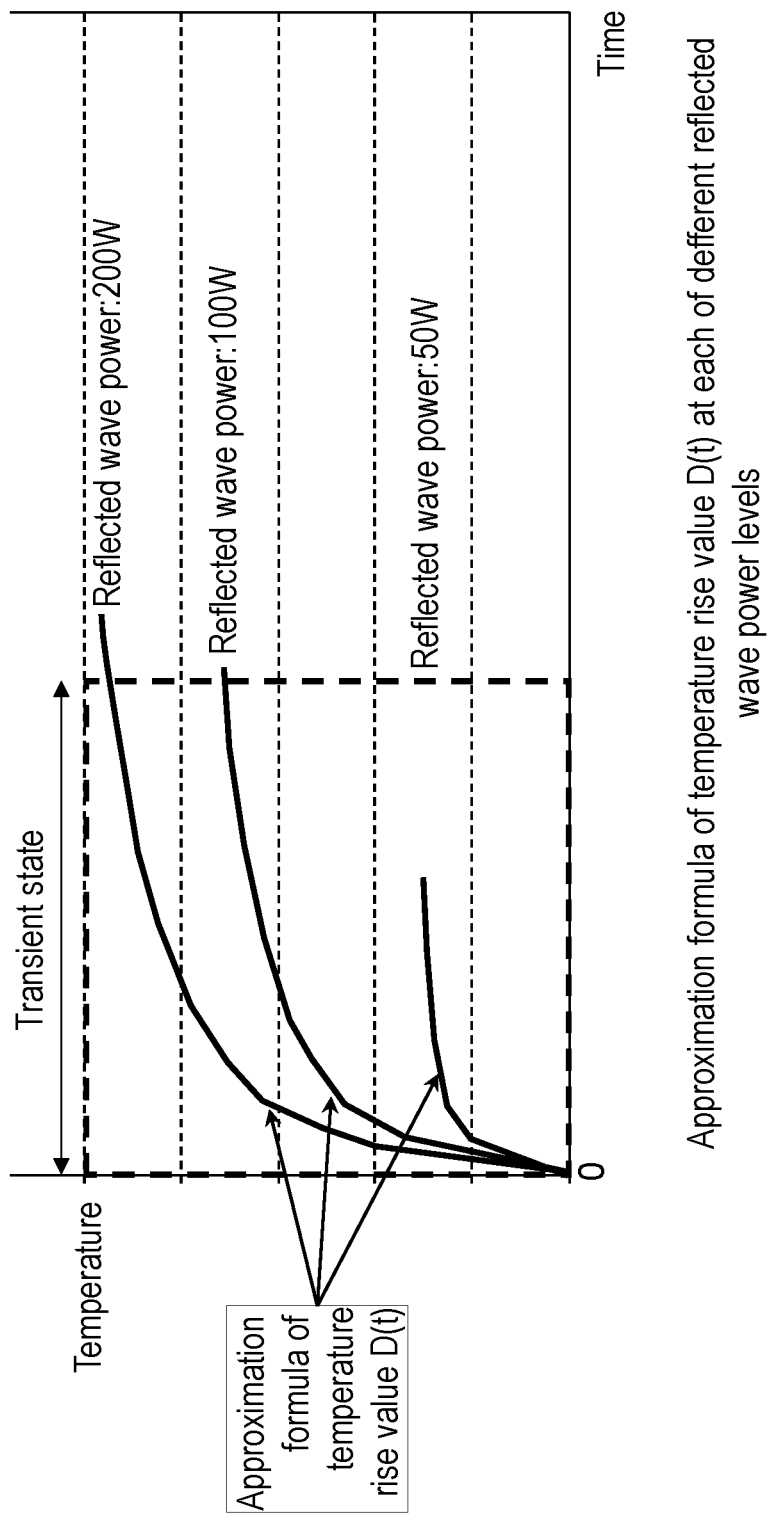
FIG. 4 is a graph showing temporal changes in temperature rise value D(t) in each of cases that are different from one another in the reflected wave power level.
Figure 5:
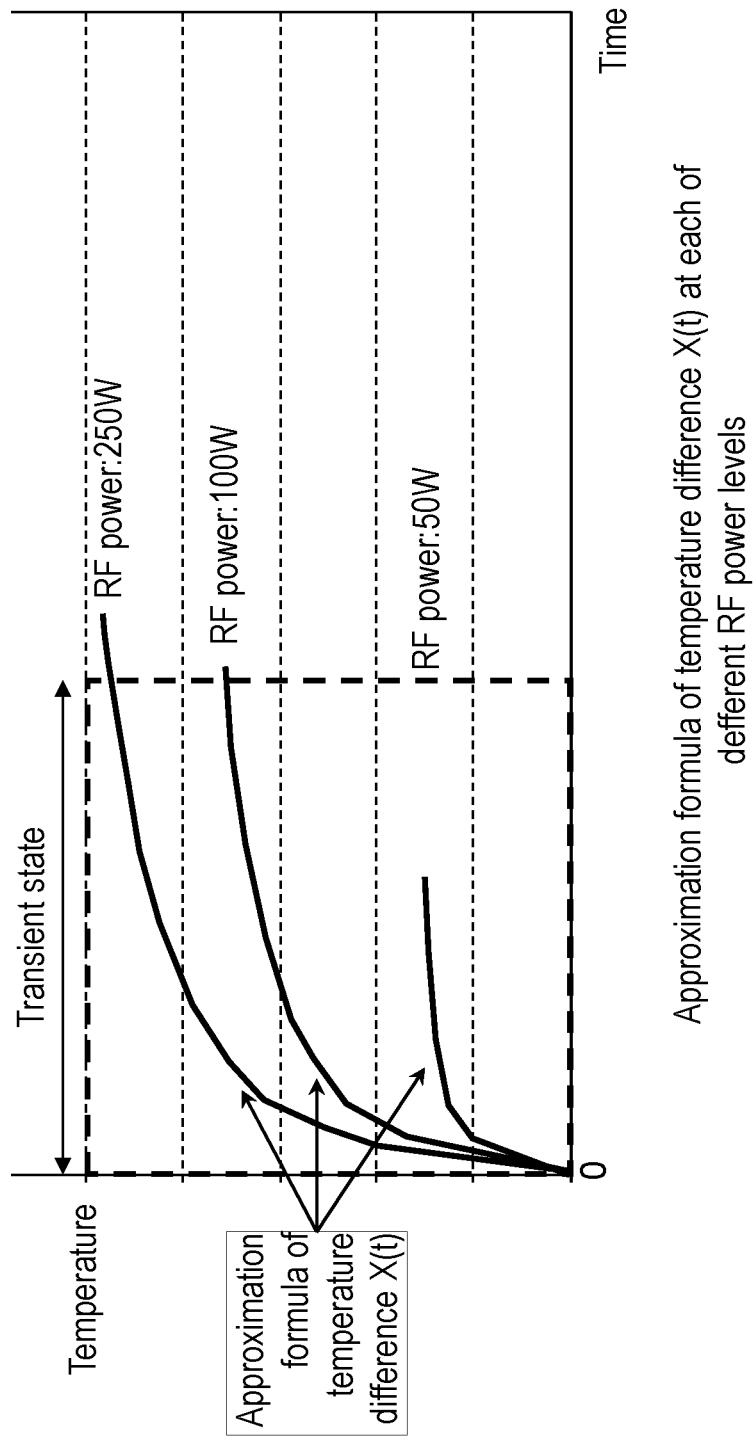
FIG. 5 is a graph showing temporal changes in temperature difference X(t) in each of cases that are different from one another in the progressive wave power level.

FIG. 4 is a graph showing temporal changes in temperature rise value D(t) in each of cases that are different from one another in the reflected wave power level. As shown in FIG. 4, temperature rise value D(t) increases as the reflected wave power increases. FIG. 5 is a graph showing temporal changes in temperature difference X(t) in each of cases that are different from one another in the RF power level (the progressive wave power level). As shown in FIG. 5, temperature difference X(t) increases as the RF power (the progressive wave power) increases.

Processor 9 calculates an approximate value of the case temperature of large signal amplifier 43 based on the approximation formula of temperature difference X(t) shown in FIG. 5, the approximation formula of temperature rise value D(t) shown in FIG. 4, and the detected temperature detected by a corresponding one of temperature sensors 6a and 6b, as shown below.

Approximate value of the case temperature≈X(t)+K (in a case where the reflected wave power is small)

Approximate value of the case temperature≈X(t)+D(t)+K (in a case where the reflected wave power is large)

Processor 9 may correct the detected temperatures of temperature sensors 6a and 6b in consideration of the temperatures respectively detected by temperature sensors 6c and 6d which are respectively disposed near terminators 5a and 5b. Raising the approximation accuracy of the case temperature improves the accuracy of the output control of the RF power outputted in the closed-loop control.

In other words, processor 9 considers the influence of the heat generated by each of terminators 5a and 5b on the temperature detected by a corresponding one of temperature sensors 6a and 6b in both the transient period and the steady state of the operation of outputting the RF power. In this manner, processor 9 calculates the approximate value of the case temperature of large signal amplifier 43 from the temperature detected by a corresponding one of temperature sensors 6a and 6b.

In the following description, the term written simply as "the temperature" means the approximate value of the case temperature of large signal amplifier 43. Accordingly, the term "the change in the temperature" means the change in the approximate value of the case temperature.

In the burst operation, processor 9 changes the output control of the RF power optimally to the closed-loop control or the open-loop control. This control makes it possible to suppress the overshoot of the output RF power and to improve the accuracy of the output control of the RF power in the burst operation.

Figure 6:
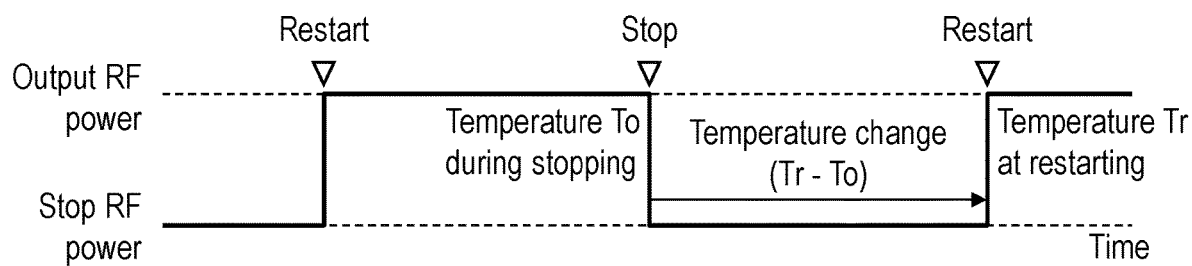
FIG. 6 is a diagram showing an example of condition for change used to determine a change of the output control of the RF power in the burst operation from the closed-loop control to the open-loop control.

FIG. 6 is a diagram showing an example of condition for change used to determine a change of the output control of the RF power in the burst operation from the closed-loop control to the open-loop control. As shown in FIG. 6, processor 9 sets the output control of the RF power to one of the closed-loop control and the open-loop control based on a result of comparison of temperature To at the time the RF power is stopped and temperature Tr at the time output of the RF power is restarted.

Specifically, in the case where the temperature change (Tr−To) during the period of stopping the output of the RF power in the burst operation has exceeded a specified threshold value, processor 9 changes the output control of the RF power from the closed-loop control to the open-loop control and restarts the burst operation.

In the case where the temperature change (Tr−To) is within the specified threshold value, processor 9 continues the closed-loop control and restarts the burst operation. In other words, the specified condition for change in this case is that the temperature change during the period in which output of the RF power is being stopped exceeds a specified temperature range.

In the case where the temperature change (Tr−To) has exceeded the specified threshold value, processor 9 sets the output set value of the RF power using the look up table as an initial setting at the time of restarting the burst operation. In and after the second control period after the restart of outputting the RF power, processor 9 appropriately changes the output control of the RF power from the open-loop control to the closed-loop control.

Figure 7:
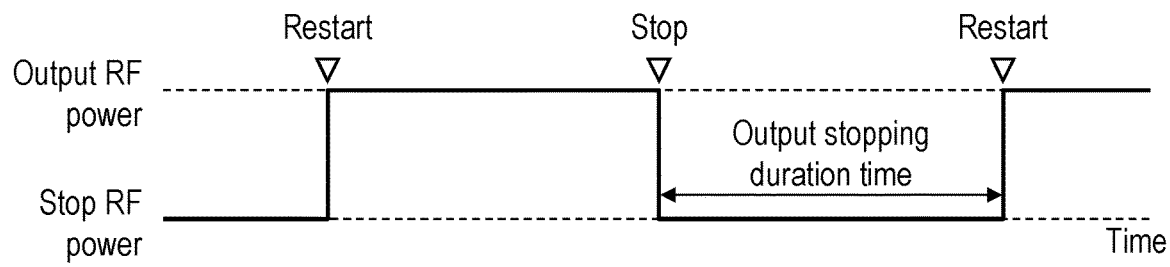
FIG. 7 is a diagram showing another example of condition for change used to determine a change of the output control of the RF power in the burst operation from the closed-loop control to the open-loop control.

FIG. 7 is a diagram showing another example of condition for change used to determine a change of the output control of the RF power in the burst operation from the closed-loop control to the open-loop control. As shown in FIG. 7, processor 9 may change the output control of the RF power from the closed-loop control to the open-loop control based on the length of the output stopping period. The output stopping period is the period from the time at which output of the RF power is stopped to the time at which output of the RF power is restarted, or the period during which output of the RF power is being stopped in the burst operation.

Figure 11:
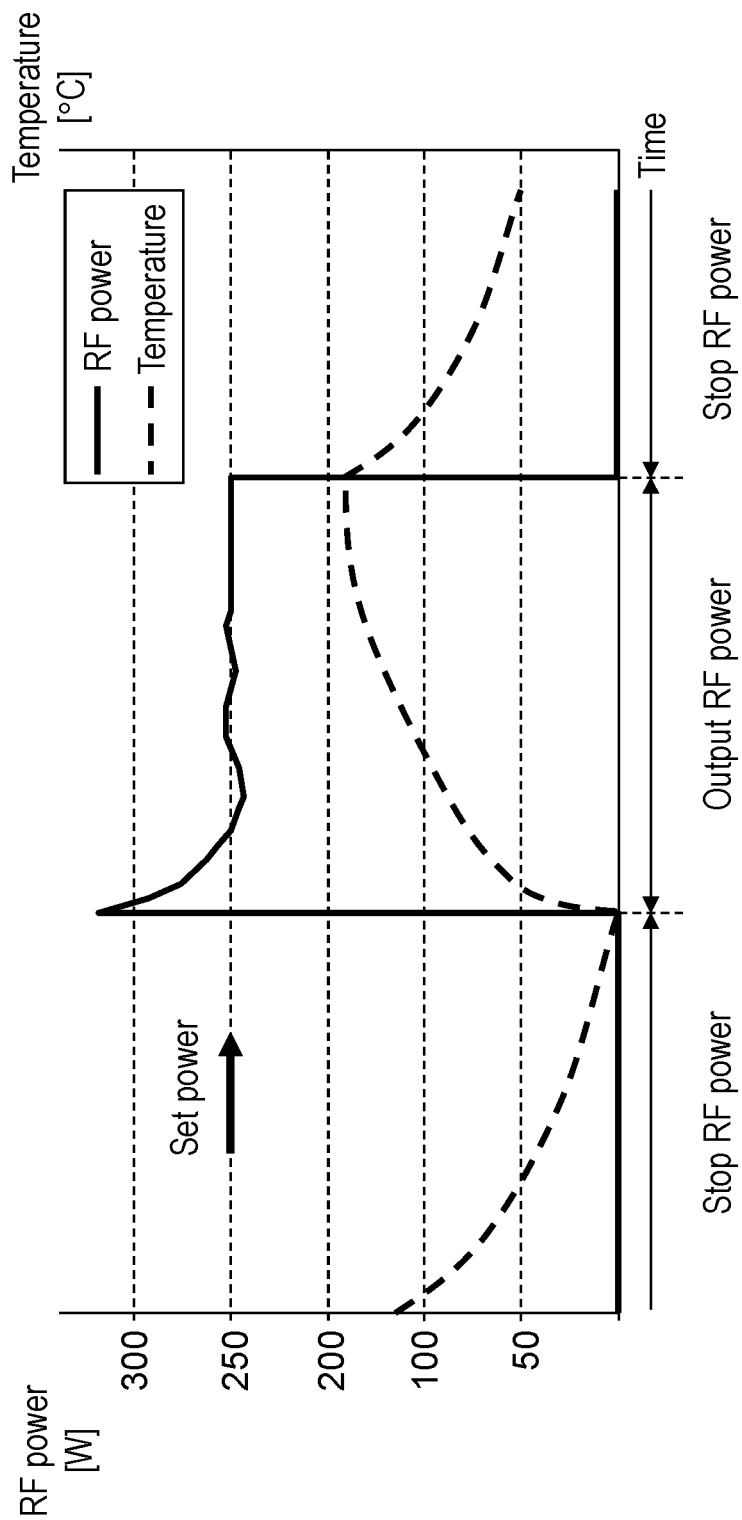
FIG. 11 is a diagram showing temporal changes in the RF power and in the temperature of the power amplifier when the conventional RF energy radiation device shown in FIG. 10 is performing the burst operation.

During the transient period after the restart of outputting the RF power, it is improper to use the output target value of the RF power calculated by the closed-loop control. The reason for this is that the temperature of large signal amplifier 43 drops largely when large signal amplifier 43 continues in the stopped state for more than a certain period of time (see FIG. 11).

Therefore, when the output stopping period has exceeded a specified length of time, processor 9 changes, before the restart of outputting the RF power, the output control of the RF power from the closed-loop control to the open-loop control that uses the look up table stored in memory 10. This makes it possible to suppress the overshoot of the RF power shown in FIG. 11.

In and after the second control period after the restart of outputting the RF power, processor 9 appropriately changes the output control of the RF power from the open-loop control to the closed-loop control. In other words, the specified condition for change in this case is that the output stopping period has exceeded the specified length of time.

As described above, processor 9 performs switching between the closed-loop control and the open-loop control to suppress the overshoot. In addition, according to the present exemplary embodiment, processor 9 causes power amplifiers 2a and 2b to operate as described below during the transient period after the restart of outputting the RF power.

Figure 8:
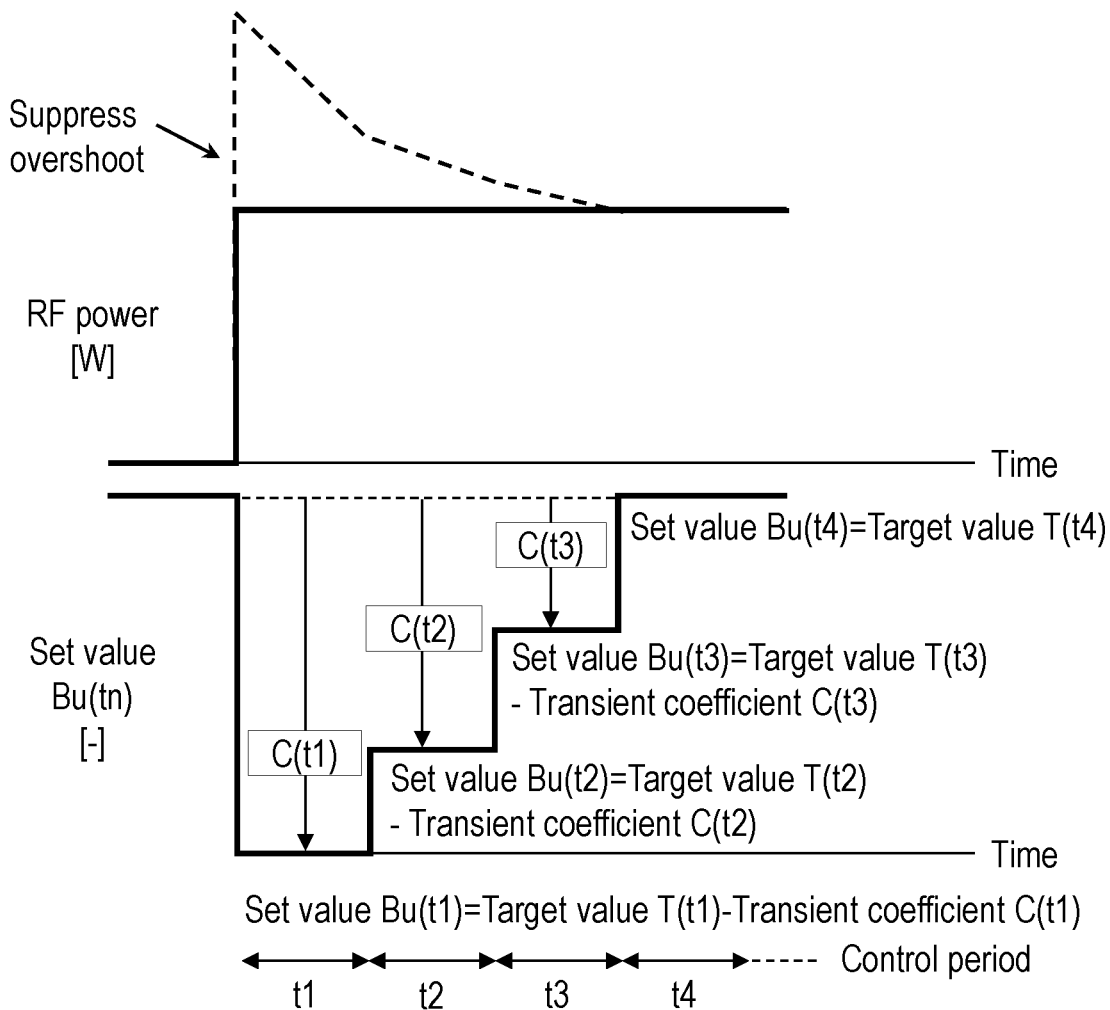
FIG. 8 is a diagram showing temporal changes in the output set value of the RF power during the transient period after a restart of outputting the RF power in the burst operation.

FIG. 8 is a diagram showing temporal changes in the output set value of the RF power during the transient period after the output of the RF power in the burst operation has been restarted.

As shown in FIG. 8, processor 9 first determines an output target value of the RF power. Processor 9 subtracts a transient coefficient from the output target value to set the output set value of the RF power to be a value smaller than the output target value of the RF power.

Thereafter, processor 9 increases the output set value of the RF power step by step in every specified period toward the output target value until the output set value reaches the output target value. As shown in FIG. 8, the specified period may, for example, be the control period of the software control performed by processor 9.

As an example, processor 9 applies at least one transient coefficient to the output target value of the RF power to set the output set value after the restart of outputting the RF power as shown below.

Set value Bu(tn)=Target value T(tn)−Transient coefficient C(tn)

Here, tn is the n-th control period. The set value T(tn) is the output set value of the RF power in the control period tn.

The target value T(tn) is the output target value of the RF power in the control period tn obtained by the closed-loop control or the open-loop control.

The transient coefficient C(tn) is a value for setting the set value Bu(tn) to be a value lower than the target value T(tn) during the transient period. The set value Bu(tn), the target value T(tn), and the transient coefficient C(tn) are dimensionless values set in processor 9.

In this way, processor 9 applies at least one transient coefficient to the output target value of the RF power to make the output set value of the RF power reach the output target value of the RF power after a lapse of a specified time.

By increasing the output set value of the RF power step by step, it is possible to suppress the overshoot of the RF power, which would otherwise be caused during the transient period after the restart of outputting the RF power in the burst operation. The accuracy of the output control of the RF power can be improved not only for the average power in the burst operation, but also for the peak power. As a result, optimum heating of the object to be heated can be realized.

As described above, the accuracy of the output control of the RF power by the closed-loop control can be improved by improving the accuracy of the approximation of the case temperature. Further, combining this improvement with the method of setting the output set value of the RF power as shown in FIG. 8, it is possible to suppress the overshoot of the RF power, so that the accuracy of the output control of the RF power in the burst operation can be further improved.

The above-described output control of the RF power makes it possible to suppress the overshoot of the RF power. On the contrary, the burst operation without using the above-described output control causes an overshoot of the output RF power.

In other words, processor 9 can adjust the level of the overshoot of the RF power by controlling the timing to change the output control of the RF power to the closed-loop control or the open-loop control.

Figure 9:
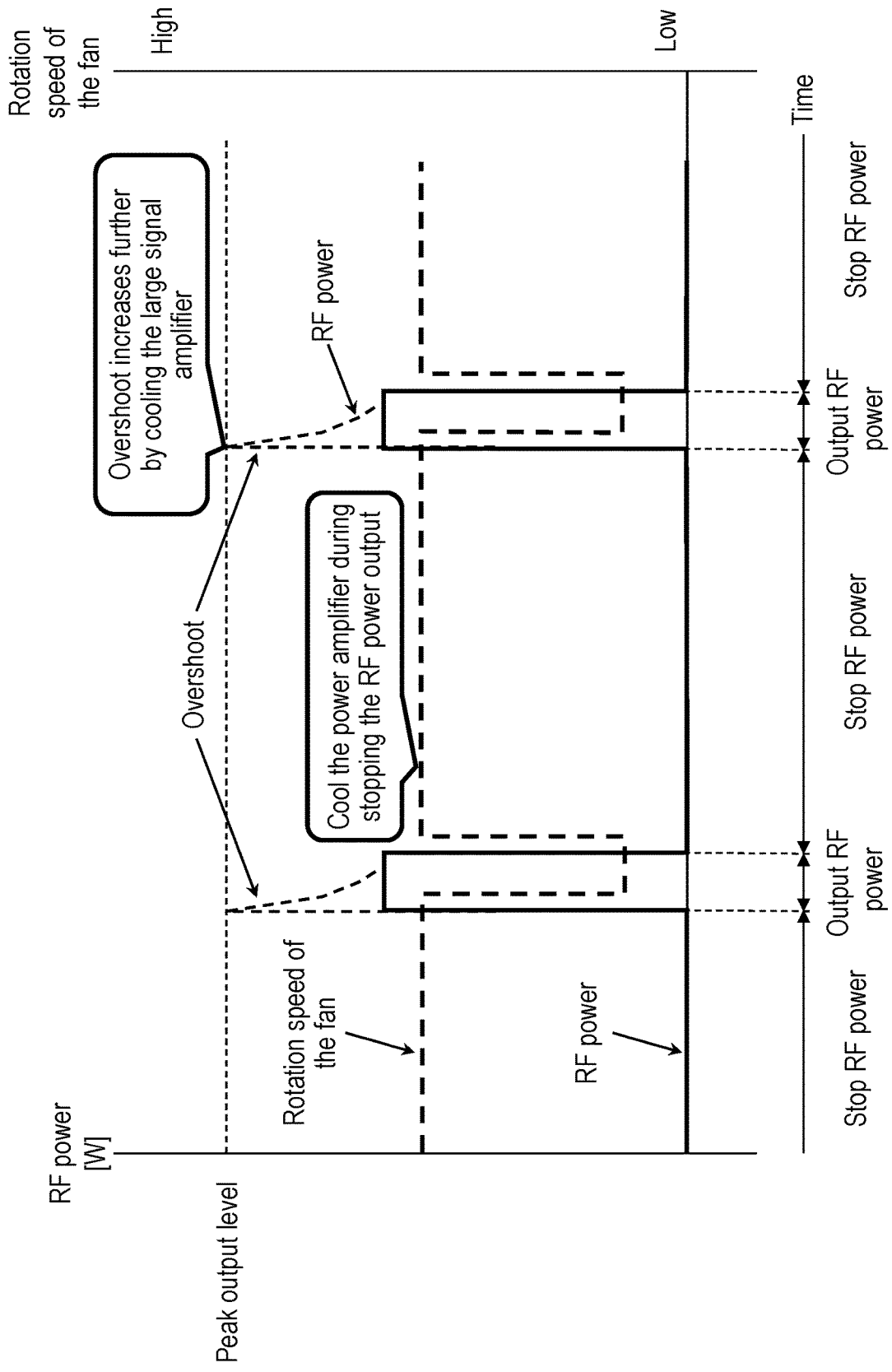
FIG. 9 is a graph showing temporal changes in the RF power and in the rotation speed of a fan during the transient period after a restart of outputting the RF power in the burst operation.
Figure 10:
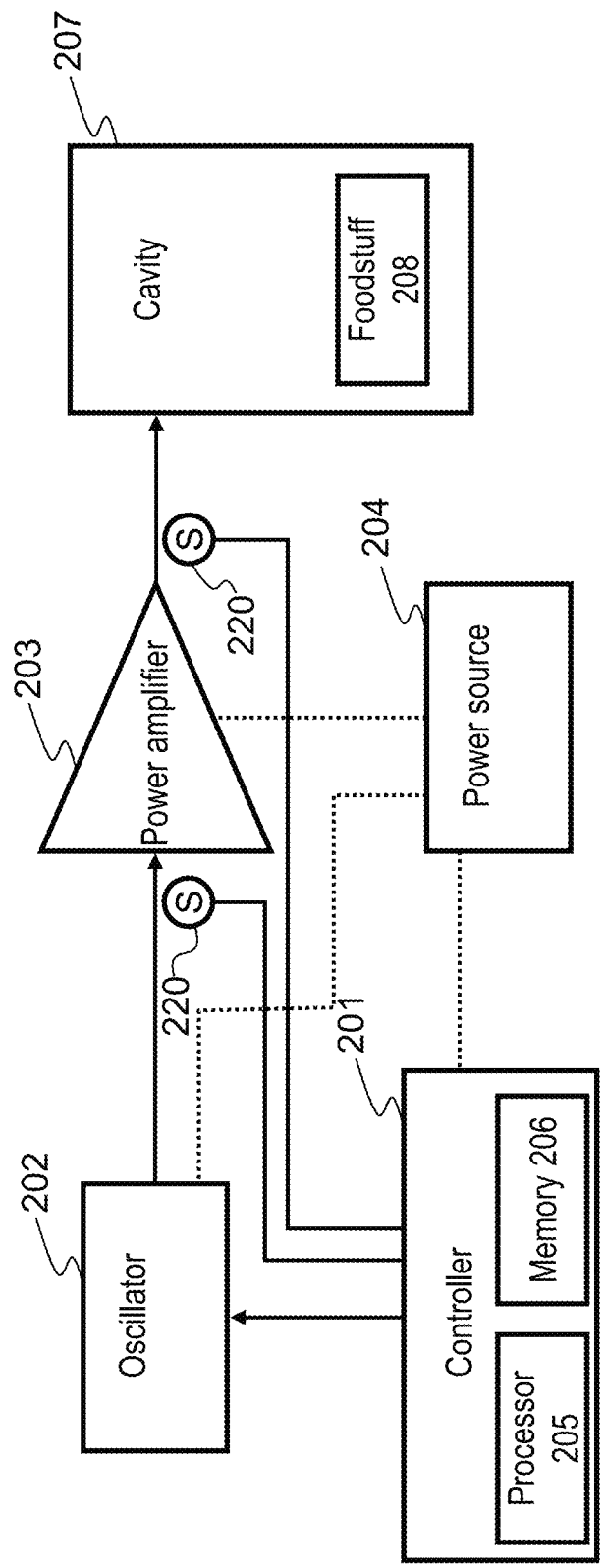
FIG. 10 is a schematic diagram showing a configuration of a conventional RF energy radiation device.

FIG. 9 is a graph showing temporal changes in the RF power and in the rotation speed of the fan during the transient period after the output of the RF power has been restarted in the burst operation. The junction temperature of large signal amplifier 43 rises rapidly after the restart of operation of large signal amplifier 43. With this rapid rise of the junction temperature, an overshoot of the output RF power is caused as shown in FIG. 9. This overshoot can be used to generate a peak output level of the RF power for a very short time.

In other words, processor 9 may intentionally not perform the control of suppressing the overshoot caused during the transient period in the burst operation. Instead, processor 9 may control the peak output level of the RF power to use the overshoot as an effect exerted on heating.

This burst operation for a short time is particularly effective in the case where the object to be heated is not heated by the microwave heating. In other words, the state of the object to be heated can be detected in real time by radiating RF energy at such a level that does not affect the state of the object to be heated. In this case, it is necessary to radiate a certain amount of RF energy in a shorter pulse.

As describe above, the junction temperature of large signal amplifier 43 rises rapidly after large signal amplifier 43 restarts operating. Along with this rapid rise of the junction temperature, the temperature difference X(t) increases rapidly as shown in FIG. 5. The curves of the approximation formula shown in FIG. 5 depend on the design of heat dissipation of large signal amplifier 43 including the volume of the air flow of the fan. It is possible to obtain a curve indicating the temporal change in the junction temperature based on the selected device and the heat dissipation design, and to obtain the approximation formula of the curve.

As described above, large signal amplifier 43 has such a temperature characteristic that the output RF power varies depending on the temperature. It is possible to cause an overshoot of the output RF power during the transient period after the restart of operation of large signal amplifier 43 by associating the approximation formula of the temperature rise during the transient period with the output RF power.

Processor 9 may consider the safety and efficiency of the entire system to control the air flow volume of the blower fan according to the duration time of outputting the RF power, the output level of the RF power, and the temperature of the device. In this case, processor 9 can estimate the instantaneous peak output level of the RF power from the approximation formulas of various conditions obtained using real data, for example, by considering the factors related to the air flow volume of the blower fan.

As shown in FIG. 9, processor 9 causes the blower fan to increase the air flow volume when the RF power is being stopped and to decrease the air flow volume when the RF power is being outputted. This makes it possible to instantaneously generate a high peak output level of the RF power.

In the case of using hardware such, for example, as an ASIC (application specific integrated circuit) or an FPGA (field-programmable gate array), output control of the RF power can be performed in a shorter control period than in the case of using the software control. In this case, however, the ratio of the cost of the hardware circuit to the whole materials cost will increase. In addition, a high development cost will be necessary. Accordingly, it is difficult to use the RF energy radiation device operated by hardware control for civil-use heating equipment and civil-use medical equipment.

In the case of performing the burst operation by a software control using a general-purpose processor without using a dedicated hardware, the control period depends on the performances of the processor. The control period corresponds to the period during which the output set value of the RF power can be changed.

In a case of a 32-bit processor having an operating frequency of about 200 MHz, for example, the control period is about 20 ms. This is a reference value in a case of using a complicated heating algorithm. It is possible to generate RF power having a peak output level for a shorter period than the control period by intentionally generating an overshoot of the output RF power as shown in FIG. 8.

Home appliances often use an 8-bit microcomputer. In this case, the control period will become further longer. However, it is possible to output RF power having a shorter duration of peak level by using an overshoot caused on the output RF power. Further, by detecting the heated state of the object to be heated in real time, it is possible to maintain the same heated state.

INDUSTRIAL APPLICABILITY

As described hereinabove, the RF energy radiation device according to the present disclosure is applicable to industrial-use heating devices, which require a highly accurate output control of the RF power.

REFERENCE MARKS IN THE DRAWINGS

1, 1*a*, 1*b* oscillator
2, 2*a*, 2*b* power amplifier 3, 3a, 3b detector
4, 4a, 4b circulator
5, 5a, 5b terminator
6, 6a, 6b, 6c, 6d temperature sensor
7, 7a, 7b radiation element
8 cavity
9 processor
10 memory
31 substrate
32 hole
33 base plate
41 variable attenuator
42 small signal amplifier
43 large signal amplifier
100 RF energy radiation device
201 controller
202 oscillator
203 power amplifier
204 power source
205 processor
206 memory
207 cavity
208 object to be heated
220 detector

The invention claimed is:

1. A radio frequency energy radiation device comprising:
an oscillator configured to generate a radio frequency signal;
a power amplifier configured to amplify the radio frequency signal to output radio frequency power;
a radiation element configured to radiate the radio frequency power;
a detector configured to detect the radio frequency power travelling toward the radiation element as progressive wave power; and
a controller configured to perform an output control of the radio frequency power using a closed-loop control that sets an output set value of the radio frequency power by a closed-loop and an open-loop control that sets the output set value of the radio frequency power by an open-loop,
wherein, in a burst operation alternately switching between a period of outputting the radio frequency power and a period of stopping the radio frequency power, the controller changes the output control of the radio frequency power from the closed-loop control to the open-loop control in a case where a specified condition for change is satisfied during the period of stopping the radio frequency power.

2. The radio frequency energy radiation device according to claim 1, wherein the specified condition for change is a condition that the period of stopping the radio frequency power exceeds a specified length of time.

3. The radio frequency energy radiation device according to claim 1, further comprising a temperature sensor configured to detect a temperature of the power amplifier,
wherein the specified condition for change is a condition that a change in the temperature exceeds a specified value during the period of stopping the radio frequency power.

4. The radio frequency energy radiation device according to claim 1, wherein the controller applies at least one transient coefficient to an output target value of the radio frequency power calculated in the closed-loop control or the open-loop control to increase the output set value in a stepwise manner until the output set value reaches the output target value.

5. The radio frequency energy radiation device according to claim 1, further comprising a memory that stores a table prepared in advance,
wherein the controller uses the table to set the output set value of the radio frequency power in the open-loop control.

6. The radio frequency energy radiation device according to claim 1, wherein the controller does not change the output control of the radio frequency power from the closed-loop control to the open-loop control even in the case where the specified condition for change is satisfied to cause an overshoot of the radio frequency power in the burst operation.

7. The radio frequency energy radiation device according to claim 1, further comprising:
a temperature sensor configured to detect a temperature of the power amplifier; and
a terminator configured to terminate reflected wave power that is a part of the progressive wave power and returned from the radiation element,
wherein the power amplifier includes a large signal amplifier, and
wherein the controller calculates an approximate value of a case temperature of the large signal amplifier from a temperature detected by the temperature sensor based on heat generated by the terminator.

* * * * *